(12) United States Patent
Ackerman et al.

(10) Patent No.: US 10,230,579 B2
(45) Date of Patent: Mar. 12, 2019

(54) TECHNIQUES FOR COMPUTER SYSTEM CONFIGURATION ANALYSIS

(71) Applicant: NETAPP, INC., Sunnyvale, CA (US)

(72) Inventors: Ross Ackerman, Cary, NC (US); Maarten Lippmann, Del Mar, CA (US)

(73) Assignee: NETAPP, INC., Sunnyvale, CA (US)

( * ) Notice: Subject to any disclaimer, the term of this patent is extended or adjusted under 35 U.S.C. 154(b) by 154 days.

(21) Appl. No.: 15/141,401

(22) Filed: Apr. 28, 2016

(65) Prior Publication Data

US 2017/0317884 A1 Nov. 2, 2017

(51) Int. Cl.
*G06F 15/00* (2006.01)
*H04L 12/24* (2006.01)

(52) U.S. Cl.
CPC .......... *H04L 41/0866* (2013.01); *G06F 15/00* (2013.01); *H04L 41/0869* (2013.01)

(58) Field of Classification Search
CPC .............. H04L 41/0816; H04L 41/0866; H04L 41/0869; G06F 15/00
USPC ......................................................... 709/221
See application file for complete search history.

(56) References Cited

U.S. PATENT DOCUMENTS

| | | | | |
|---|---|---|---|---|
| 2007/0300103 | A1* | 12/2007 | Verbowski | G06F 11/0748 714/37 |
| 2008/0270515 | A1* | 10/2008 | Chen | G06F 9/4856 709/202 |
| 2010/0146339 | A1* | 6/2010 | Hansson | G06F 11/324 714/37 |
| 2012/0005318 | A1* | 1/2012 | Beaty | H04L 41/0672 709/221 |
| 2012/0144023 | A1* | 6/2012 | Guest | H04L 61/1511 709/224 |
| 2014/0280100 | A1* | 9/2014 | Chau | G06F 17/3053 707/724 |
| 2017/0164216 | A1* | 6/2017 | Mikkelsen | H04W 24/02 |

\* cited by examiner

*Primary Examiner* — James E Springer
(74) *Attorney, Agent, or Firm* — Klein, O'Neill & Singh, LLP

(57) ABSTRACT

A misconfiguration crowdsourcing system arranged to analyze computer system configuration. The computer system configuration may be analyzed with respect to a population of computer systems. In some embodiments, sets of configuration options may be compared for one or more computer systems in a population set. Based on the comparison, a frequency of at least one setting for a client configurable option may be determined. A target characteristic may be identified for a setting of a configuration option based on the frequency of the at least one setting for the configuration option with the population. Computer systems with configuration settings conflicting with target characteristics may be identified as unhealthy.

24 Claims, 10 Drawing Sheets

Identify a first computer system as potentially misconfigured when a client configurable option of the first computer system conflicts with a target characteristic of the client configurable option for a set of computer systems comprising the first computer system
702

Assign a likelihood of misconfiguration to the first computer system based, at least in part, on a frequency of at least one setting for the client configurable option among the set of computer systems
704

*FIG. 8*

_Storage Medium 800_

*Computer Executable Instructions for 100*

*Computer Executable Instructions for 400*

*Computer Executable Instructions for 500*

*Computer Executable Instructions for 600*

*Computer Executable Instructions for 700*

TECHNIQUES FOR COMPUTER SYSTEM CONFIGURATION ANALYSIS

BACKGROUND

A computer system may have a set of hundreds or thousands of configuration options that need to be properly set to ensure the computer system operates correctly. Typically, these configuration options include one or more settings for various components associated with or implemented by the computer system, such as software or hardware utilized by the computer system. The one or more settings may govern one or more functional aspects associated with or implemented by the computer system. Often, a configuration option includes a client editable field, also referred to as a client configurable option. The client configurable option enables a client to select or enter one or more values to enter or change a configuration option of a computer system.

BRIEF DESCRIPTION OF THE DRAWINGS

FIG. 7 illustrates an embodiment of a second logic flow.

FIG. 8 illustrates an embodiment of a storage medium.

DETAILED DESCRIPTION

Figure 1:
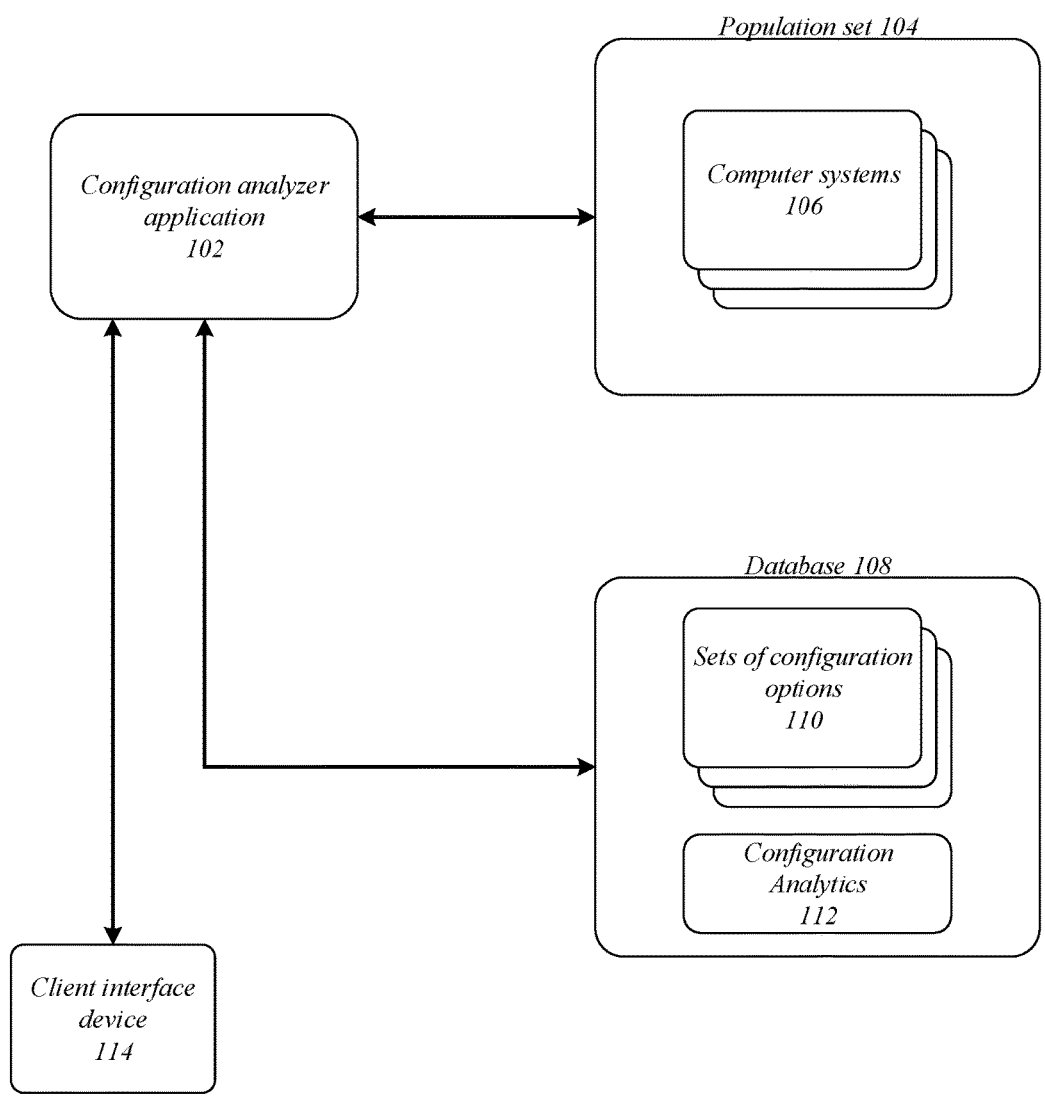
FIG. 1 illustrates an embodiment of a misconfiguration crowdsourcing system.

Various embodiments are generally directed to techniques for automated computer system configuration analysis. Some embodiments are particularly directed to misconfiguration crowdsourcing systems arranged to analyze a set of configuration options for a computer system in a population set with respect to other sets of configuration options for additional computer systems in the population set. Analysis of the set of configuration options may include identifying computer systems with abnormal configurations when compared to other computer systems in the population set or a subset of the population set. This may be achieved, at least in part by, using information from the computer systems that are similarly configured to statistically determine, per configuration option, how closely each configuration option or computer system is configured to the population set or the subset thereof. For instance, a set of configuration options may be received from a subset of computer systems in a population set. The received sets of configuration options may be indexed and stored in a database. Analytics may then be applied to the database to identify computer systems or configuration options with a likelihood of misconfiguration.

One challenge facing computer system configuration analysis includes the ability to efficiently identify abnormal configuration options. For instance, a large portion of support cases from original equipment manufacturers (OEMs) and original design manufacturers (ODMs) are typically related to software misconfigurations on computer systems. A set of configuration options for a computer system may include hundreds or thousands of options or settings controlling operation of the computer system. Further, many configuration options may require a string of characters, resulting in millions of potential settings for these configuration options. Adding further complexity, clients often deploy tens of hundreds of computer systems requiring related but varying configurations. Furthermore, a computer system may provide little or no guidance as to which configuration options may be improper or how to correct improper configuration options, making identifying what a healthy system is or should be difficult and time consuming. These factors may result in advanced knowledge being required to keep a computer system or population of computer systems properly configured. Such limitations can drastically increase the cost and complexity of employing a population of computer systems, contributing to inefficient systems with reduced capabilities.

Conventional solutions attempt to solve the difficulties associated with computer system configuration analysis by requiring manual analysis of sets configuration options. It is impractical and slow to accurately or efficiently manually analyze configuration options, increasing downtimes and service outages. Additionally, configuration experts can be expensive. Such techniques may entail needless complexity, high costs, and poor efficiency.

To solve these and other problems, various embodiments include a configuration analyzer application to efficiently and accurately analyze a set of configuration options for a computer system with respect to one or more additional sets of configuration options for other computer systems to identify computer systems that are likely misconfigured. The configuration analyzer application may operate to identify configuration options that do not adhere to a target characteristic (e.g., most common value). The target characteristic may be based on analysis of sets of configuration options for a population of computer systems or subset thereof. The analysis may include determining a frequency of one or more settings or values for configuration options. The frequency of a value for a configuration option may in turn be utilized in determining adherence to the target characteristic. In these and other ways the configuration analyzer application may enable robust and efficient misconfiguration crowdsourcing to achieve improved computer system configuration analysis.

In various embodiments, the configuration analyzer application may receive a set of configuration options for each of a subset of computer systems in a set of computer systems associated with each other, each set of configuration options may include at least a computer system identifier and a client configurable option. In various such embodiments, the configuration analyzer application may compare settings for the client configurable option among each of the received sets of configuration options, determine a frequency of at least one value for a configuration option for the client configurable option based on the comparison, and identify a target characteristic of the client configurable option based, at least in part, on the frequency of the at least one value for the configuration option for the client configurable option.

The use of a configuration analyzer application provides several technical effects and advantages relative to conventional technologies and solutions. For example, the application of analytics to a population of computer systems may increase reliability and decrease costs of operating the population set. Further, using a configuration analyzer application may allow ready identification of configuration options of a computer system that are likely misconfigured, leading to more reliable operation and reduced error rates. Furthermore, a target characteristic, such as the most common value for the configuration option, may be determined to enable efficient correction of the misconfiguration. This greatly increases the ability to identify and correct misconfigured computer systems. For example, ranking configuration options of a computer system based on their comparison to a population set or subset in one or more ways may improve the ability to resolve configuration issues within computer systems, allowing clients to spend less time identifying configuration problems. These and other advantages described herein can result in improved computer system configurations, such as with more accurate, reliable, quick, and adaptable computer system configuration analysis.

With general reference to notations and nomenclature used herein, portion of the detailed description which follows may be presented in terms of program procedures executed on a computer or network of computers. These procedural descriptions and representations are used by those skilled in the art to most effectively convey the substances of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatus may be specially constructed for the required purpose or may include a general-purpose computer. The required structure for a variety of these machines will be apparent from the description given.

Reference is now made to the drawings, wherein like reference numerals are used to refer to like elements throughout. In the following description, for purpose of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modification, equivalents, and alternatives within the scope of the claims.

FIG. 1 illustrates one embodiment of a misconfiguration crowdsourcing system 100. Misconfiguration crowdsourcing beings with receiving data from a population set 104 of computer systems 106. The received data may include sets of configuration options 110. In some embodiments the sets of configuration options 110 may include anything regarding the computer system that is client configurable. The sets of configuration options may be received, processed, stored in a database 108, and analyzed via a configuration analyzer application 102. Processing by the configuration analyzer application 102 may include indexing the sets of configuration options 110 as well as the settings and options therein by common attributes such as name, location, application use, model, and the like. In some embodiments, processing the sets of configuration options 110 may generate one or more portions of configuration analytics 112. Analyzing the sets of configuration options 110 may include applying analytics to the sets of configuration options 110. In some embodiments, analyzing the sets of configuration options 110 may generate one or more portions of configuration analytics 112. In various embodiments, configuration analytics 112 are presented via client interface device 114. These and other features of the configuration analyzer application 102 may provide valuable and effective identification of abnormal configuration options and unhealthy computer systems that are using abnormal configuration options. Embodiments are not limited in this context.

The configuration analyzer application 102 be interposed between population set 104 and database 108. Sets of configuration options 110 may be received from one or more computer systems within the population set 104. In some embodiments, the sets of configuration options may be retrieved by configuration analyzer application 102. The configuration analyzer application may index and store the sets of configuration options 110 in database 108. Configuration analyzer application may then generate configuration analytics 112 by performing indexing and/or statistical analysis of the sets of configuration options 110. In some embodiments the configuration analyzer application 102 may execute on one of computer systems 106. In various embodiments a configuration analyzer application daemon may operate on one or more computer systems 106 of population set 104.

The database 108 may provide storage for system 100 via one or more computer-readable media. In some embodiments, configuration analyzer application 102 may receive sets of configuration options 110 and store them in database 108. The computer-readable media may be local, removable, or remote. For instance, database 108 may be reside on a computer-readable media embedded in a computer system, on a remote server, on a removable storage device, or the like. In various embodiments, the sets of configuration options 110 may be preloaded with sets of configuration options (e.g., server repository, removable storage device, etc.). In various such embodiments, retrieval of configuration data from population set 104 may be foregone.

In some embodiments analysis of the sets of configuration options 110 may be directed via the client interface device 114. In various such embodiments, the client interface device 114 may utilize a display to facilitate input/output (I/O). For example, the client interface device 114 may present a graphical user interface (GUI) on the display to facilitate I/O. In various such embodiments, the client interface device 114 and the configuration analyzer application 102 may operate on the same computer system. In some embodiments client interface device 114 or configuration analyzer application 102 may operate on a computer system not in population set 104.

Figure 2:
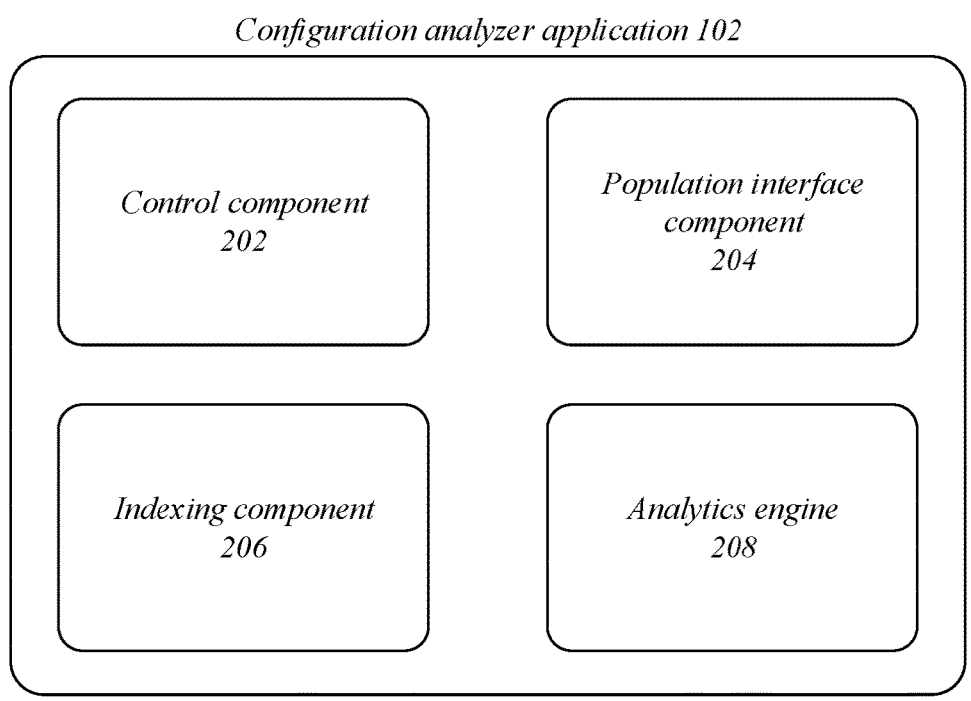
FIG. 2 illustrates an embodiment of a configuration analyzer application of an exemplary misconfiguration crowdsourcing system.

FIG. 2 illustrates an embodiment of the configuration analyzer application 102. The configuration analyzer application 102 may enable the system 100 to efficiently identify abnormal configuration options and unhealthy computer systems that are employing the abnormal configuration options. In some embodiments, components of the configuration analyzer application 102 may interoperate to retrieve data regarding one or more computer systems 106 in population set 104. The retrieved data may include a set of configuration options from one or more computer systems 106 in population set 104. The set of configuration options may include one or more of client configurable configuration options, identifying information, and other related data. The received sets of configuration options may be indexed and stored in a database. Analytics may then be applied to the database to identify computer systems or configuration options with a likelihood of misconfiguration. These and other features of the configuration analyzer application 102 may provide accurate and effective identification of abnormal configuration options and unhealthy computer systems that are using abnormal configuration options. Embodiments are not limited in this context.

As shown in FIG. 2, the configuration analyzer application 102 may include control component 202, population interface component 204, indexing component 206, and analytics engine 208. The parts may function to receive, process, store in database 108, and analyze sets of configuration options 110. Receiving may include retrieving sets of configuration options, such as by sending request or via a daemon. Processing by the configuration analyzer application 102 may include indexing the sets of configuration options 110 as well as the settings and options therein by common attributes such as name, location, application use, model, and the like. In some embodiments processing the sets of configuration options 110 results in generation of one or more portions of configuration analytics 112.

Analyzing the sets of configuration options 110 may include applying analytics the sets of configuration options 110. The analytics may include statistical analysis of population set 104 or a subset thereof. In various embodiments the subset of computer systems may include any combination of computer systems in the population set. In some embodiments, the analytics may include comparing a single computer system to population set 104 using Bayesian statistics. In various embodiments analyzing the sets of configuration options 110 may generate one or more portions of configuration analytics 112. In various embodiments, configuration analytics 112 are provided to client interface device 114 directly or through control component 202.

Control component 202 may implement one or more of the population interface component 204, indexing component 206, and analytics engine 208. In some embodiments control component may implement a client interface, such as via client interface device 114. A client may direct the configuration analyzer application 102 by performing I/O operations with configuration analyzer application 102, such as via control component 202, for example.

The population interface component 204 may receive sets of configuration options 110 from computer systems 106. In some embodiments, population interface component 204 may request or retrieve configuration option sets from computer systems 106. In various embodiments, population interface component 204 may retrieve sets of configuration options by copying them from computer systems 106. Population interface component 204 may interact with computer systems 106 in population set 104 via a network, such as a wired or wireless local area network (LAN), the internet, or the like, for example. In some embodiments the interaction utilizes a defined interface. The defined interface may be employed according to one or more standards (e.g., Institute of Electrical and Electronics Engineers (IEEE) standards). In various embodiments the population interface component may interact with a computer system via a daemon.

The indexing component 206 may process and store received sets of configuration options 110. Processing by the configuration analyzer application 102 may include indexing the sets of configuration options 110 as well as the settings and options therein by common attributes such as name, location, application use, model, and the like. In some embodiments processing of received sets of configuration options may utilize analytics engine 208. Processing the sets of configuration options 110 may result in generation of one or more portions of configuration analytics 112. For instance, the sets of configuration options 110 may be processed to generate target characteristics (e.g., most common value). In some embodiments, target characteristics may be generated based on frequency of different settings for corresponding configuration options. The indexing component 206 may also store sets of configuration options, such as in database 108. In some embodiments, the indexing component 206 may store configuration data then process it. In other embodiments, the indexing component 206 may process configuration data then store it. Determination of the order may rely on I/O activity with population set 104 or client interface device 114.

The analytics engine 208 may analyze sets of configuration options 110 in database 108 using statistics. Analyzing the sets of configuration options 110 may include generating one or more portions of configuration analytics 112. In some embodiments, Bayesian statistics may be applied to compare one or more configuration options of a computer system with sets of configuration options 110 associated with computer systems 106 in a population set 104 or subset thereof (e.g., population subset 308). For instance, computer system specific adherence to target characteristics may be generated as a portion of configuration analytics 112. Analysis of configuration options or computer systems via analytics engine 208 may be used to readily identify abnormal configuration options and unhealthy computer systems that may be using abnormal configuration options. For example, with specific configuration options, analysis based on target characteristics may be performed, such as classifying configuration options as almost fully unique (e.g., the most common value is only applied to less than 10% of the population), largely discordant (e.g., the most common value is only applied to 10-50% of the population), largely accordant (e.g., 50-90%), almost fully accordant (90-99%), and fully accordant for example. In various embodiments one or more portions of the analysis may be performed automatically with respect to one or more computer systems 106 or configuration options, such as according to a model or set of rules.

The classifications may each provide different indicators of likelihood of misconfiguration. Fully unique and fully accordant setting may provide minimal value in determining misconfiguration. Settings that are almost fully unique as well as almost fully accordant may provide the strongest indication of configuration errors that may require remediation. In some embodiments, attributes may be presented in order or likelihood of misconfiguration (e.g., almost fully accordant, almost fully unique, largely accordant, and largely discordant). In various embodiments, with specific systems, a weighted count can be provided indicating the percentage of configuration options present in the different categories of comparative configuration. In various such embodiments, computer systems may be presented in order of the weighted number of comparative misconfiguration.

Figure 3:
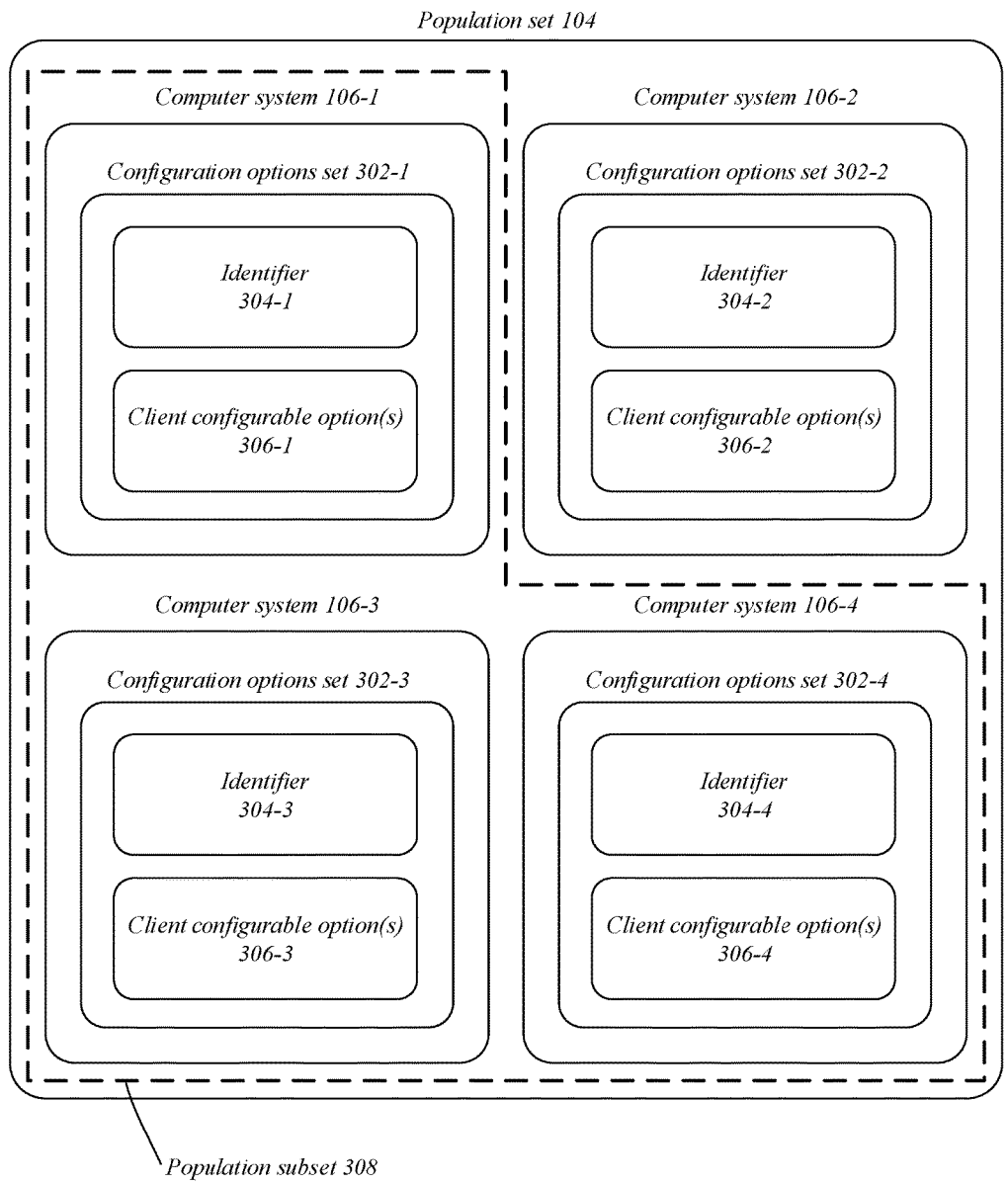
FIG. 3 illustrates an embodiment of a population set of an exemplary misconfiguration crowdsourcing system.

FIG. 3 illustrates an exemplary embodiment of population set 104. The population set 104 may include computer systems 106-1, 106-2, 106-3, 106-4. In the illustrated embodiment, computer systems 106-1, 106-2, 106-3, 106-4 include respective configuration option sets 302-1, 302-2, 302-3, 302-4. The configuration option sets 302-1, 302-2, 302-3, 302-4 may include respective identifiers 304-1, 304-2, 304-3, 304-4, and respective user configurable option(s) 306-1, 306-2, 306-3, 306-4. Configuration option sets may be used by misconfiguration crowdsourcing system 100 to efficiently identify abnormal configuration options and unhealthy computer systems that are employing the abnormal configuration options. Embodiments are not limited in this context.

Computer systems 106-1, 106-2, 106-3, 106-4 may include one or more terminals implementing one or more types of software and hardware components. Each of these components may operate according to one or more client configurable options (e.g., 306-1, 306-2, 306-3, 306-4). Configuration options sets 302-1, 302-2, 302-3, 302-4 may include a record of user configurable options 306-1, 306-2, 306-3, 306-4 for each computer system 106-1, 106-2, 106-3, 106-4 respectively. Configuration options sets 302-1, 302-2, 302-3, 302-4 may also include identifiers 306-1, 306-2, 306-3, 306-4 to enable configuration option sets to be associated with a particular computer system once received.

In some embodiments not all of computer systems 106 in population set 104 may include configuration option sets. For instance a configuration options set may not be generated by some computer systems. In some embodiments, configuration options sets may be received only for a fraction of computer systems in population set 104, such as population subset 308. In various embodiments, configuration options sets 302-1, 302-2, 302-3, 302-4 may be generated by daemons operating on respective computer systems 106-1, 106-2, 106-3, 106-4. In various such embodiments, the daemon may send the configuration option sets to the configuration analyzer application 102.

Figure 4:
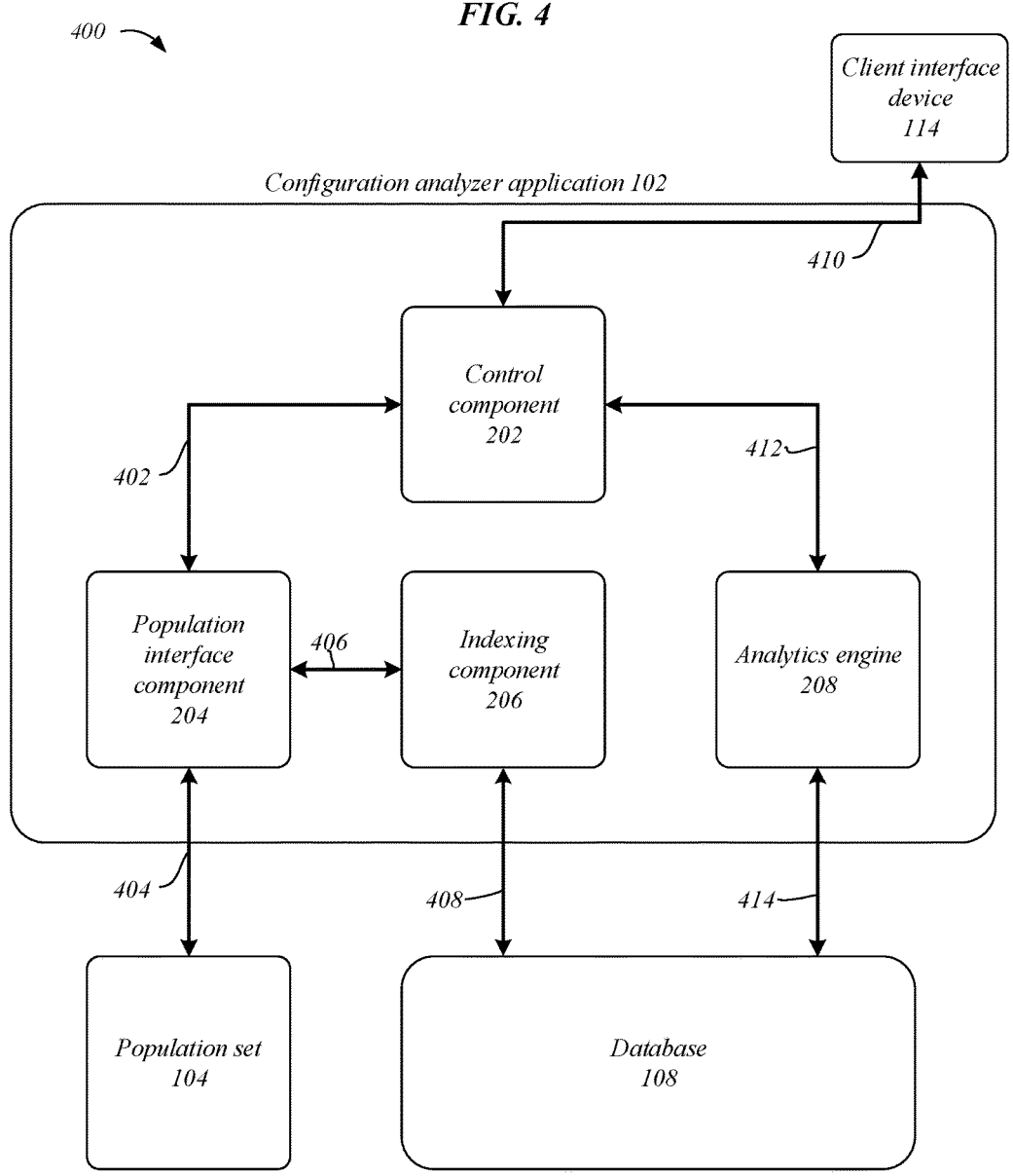
FIG. 4 illustrates a first example process flow for analyzing a population set with an embodiment of a configuration analyzer application.

FIG. 4 illustrates a first example process flow for analyzing population set 104 with configuration analyzer application 102. In the exemplary process flow, the control component 202, population interface component 204, indexing component 206, and analytics engine 208 of the configuration analyzer application 102 are used in conjunction with database 108 to analyze configuration options of population set 104 and present the analysis via client interface device 114. Embodiments are not limited in this context.

At 402, control component 202 may direct population interface component 204 to collect sets of configuration options. In some embodiments, this may be in response to a command received from client interface device 114. At 404, population interface component 204 may receive sets of configuration options from one or more computer systems of population set 104. In some embodiments the sets of configuration options may be received in response to a request sent by population interface component 204. In various embodiments, sets of configuration options may be received via population interface component retrieving them from computer systems in population set 104.

At 406, the configuration data may be passed to indexing component 205. The indexing component 206 may process and store received sets of configuration options at 408. Processing by the indexing component 205 may include indexing the sets of configuration options 110 as well as the settings and options therein by common attributes such as name, location, application use, model, and the like. In various embodiments, processing by indexing component 205 may result in generation of target characteristics for computer systems or configuration options. In some embodiments processing of received sets of configuration options may utilize analytics engine 208. The indexing component 206 may store one or more of sets of configuration options 110 and configuration analytics 112, in database 108. In some embodiments, the indexing component 206 may store configuration data then process it. In other embodiments, the indexing component 206 may process configuration data then store it.

At 412, control component may direct analytics engine 208 to analyze the sets of configuration options 110 in database 108. In various embodiments, the analytics engine 208 may be directed to analyze the sets of configuration options 110 by indexing component 206 or client interface device 114. At 414, analytics engine may interact with database 108 to analyze the sets of configuration options 110. In some embodiments, this may include generating one or more portions of configuration analytics 112. For example, adherence to target characteristics of one or more computer systems in population set 104 may be generated as configuration analytics 112. Analysis of configuration options or computer systems via analytics engine 208 may be used to readily identify abnormal configuration options and unhealthy computer systems that may be using abnormal configuration options. For example, computer systems or configuration options may be classified based on the target characteristics. In some embodiments the target characteristics may be based on frequency of configuration option settings among population set 104 or population subset 308.

The classifications may each provide different indicators of likelihood of misconfiguration. Fully unique and fully accordant setting may provide minimal value in determining misconfiguration. Settings that are almost fully unique as well as almost fully accordant may provide the strongest indication of configuration errors that may require remediation. In some embodiments, attributes may be presented in order or likelihood of misconfiguration (e.g., almost fully accordant, almost fully unique, largely accordant, and largely discordant). In various embodiments, with specific systems, a weighted count can be provided indicating the percentage of configuration options present in the different categories of comparative configuration. In various such embodiments, computer systems may be presented in order of the weighted number of comparative misconfiguration.

In some embodiments, results of a configuration analysis may include one or more tables of configuration options. For example, a configuration analysis may be represented as show in the following Table 1, below.

TABLE 1

| Configuration option | Most common value | Frequency (%) |
|---|---|---|
| autosupport.from | nas.asup@example_email.xxx | 4.9 |
| cifs.audit.file_access_events.enable | on | 99.84 |
| cifs.oplocks.opendelta | 0 | 99.81 |
| cifs.signing.enable | off | 99.81 |
| cifs.smb2_1.branch_cache.enable | off | 99.81 |
| dns.cache.enable | on | 99.81 |
| ftpd.anonymous.enable | off | 99.81 |
| ftpd.anonymous.home_dir | | 99.81 |
| ftpd.dir.override | | 99.81 |
| ftpd.tcp_widow_size | 28960 | 99.81 |
| ldap.usermap.attribute.unixaccount | unixaccount | 99.81 |
| ldap.usermap.attribute.windowsaccount | windowsaccount | 99.81 |
| ldap.usermap.base | | 99.81 |
| ldap.usermap.enable | off | 99.81 |
| ndmpd access | all | 99.81 |
| ndmpd.tcpnodelay.enable | off | 99.81 |
| nfs.kerberos.enable | off | 99.81 |
| pcnfsd.enable | off | 99.81 |
| ssh2.banner.enable | on | 99.81 |
| wafl.nt_admin_priv_map_to_root | on | 99.81 |
| webdav.enable | off | 99.81 |
| ems.autosuppress.enable | on | 99.71 |
| ftpd.max_connections | 500 | 99.71 |
| ftpd.max_connections_threshold | 0% | 99.71 |
| iscsi.isns.rev | 22 | 99.71 |
| raid.scrub.duration | 360 | 99.71 |
| snapvault.ossv.compression | off | 99.71 |
| tftpd.logging | off | 99.71 |
| tftpd.rootdir | /etc/tftpboot | 99.71 |
| timed.enable | on | 99.71 |
| wafl.default_qtree_mode | 0777 | 99.71 |
| cifs.audit.autosave.file.limit | 0 | 99.63 |
| cifs.audit.autosave.onsize.threshold | 75% | 99.63 |
| cifs.audit.logon_events.enable | on | 99.63 |
| fits.netbios_over_tcp.enable | on | 99.63 |
| cifs.universal_nested_groups.enable | on | 99.63 |
| ftpd.auth_style | mixed | 99.63 |

As shown in the above table, in some embodiments, the target characteristic may be the most common value. Further, a value for a target characteristic may take any value, such as a number, a percentage, a character, alphanumeric string, file path, address, or the like. In some embodiments, a value for a target characteristic may include an image or graph. In various embodiments, Table 1 may form one or more portions of a GUI utilized by system 100 for I/O operations, such as presenting the results of a configuration analysis.

Figure 5:
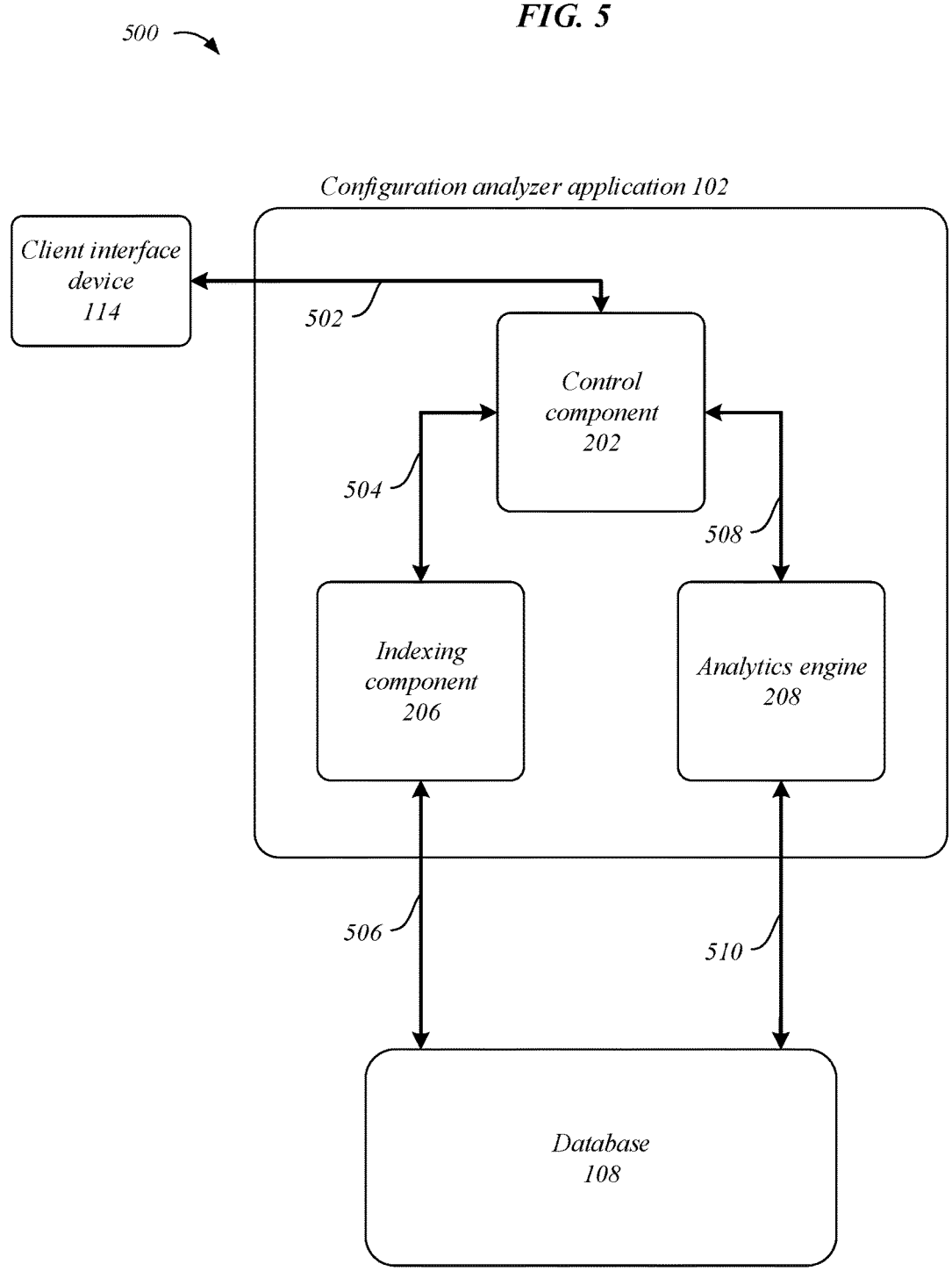
FIG. 5 illustrates a second example process flow for analyzing a population set with an embodiment of a configuration analyzer application.

FIG. 5 illustrates a second example process flow for analyzing computer system configurations with configuration analyzer application 102. In the exemplary process flow, the control component 202, indexing component 206, and analytics engine 208 of the configuration analyzer application 102 are used in conjunction with database 108 to analyze computer system configurations configuration options based on sets of configuration options stored in database 108 and present the analysis via client interface device 114. Embodiments are not limited in this context.

At 502, client interface device 114 may instruct control component 202 to process and analyze a plurality of sets of configuration options stored in database 108. In various embodiments a computer system of population set 104 may include client interface device 114. In some embodiments configuration analyzer application 102 may automatically identify new sets of configuration options in database 108. At 504 control component 202 may direct indexing component 206 to process a plurality of sets of configuration options in database 108. In some embodiments database 108 may include a server repository of sets of configuration options regarding population set 104 of computer systems 106. In various embodiments, database 108 may be included in storage local to a computer system of population set 104 or population subset 306.

At 506, the indexing component 206 may process the sets of configuration options in database 108. Processing by the indexing component 205 may include indexing the sets of configuration options 110 as well as the settings and options therein by common attributes such as name, location, application use, model, and the like. In various embodiments, processing by indexing component 205 may result in generation of target characteristics for computer systems or configuration options. In various such embodiments, generation of target characteristics may be based, at least in part, on frequency of different values for a respective configuration option. In some embodiments processing of sets of configuration options may utilize analytics engine 208. The indexing component 206 may store configuration analytics 112, in database 108. In some embodiments, configuration analytics 112 may include one or more target characteristics, indexed attributes, frequency, identifier, and other data associated with analysis of computer system configurations. In various embodiments, indexing component 206 may indicate completion of processing to control component 202.

At 508, control component 202 may direct analytics engine to analyze the sets of configuration options 110 in database 108. In various embodiments, the analytics engine 208 may be directed to analyze the sets of configuration options 110 by indexing component 206 or client interface device 114. At 510, analytics engine may interact with database 108 to analyze the sets of configuration options 110. In some embodiments, this may include generating one or more portions of configuration analytics 112. For example, adherence to target characteristics of one or more computer systems in population set 104 may be generated as configuration analytics 112. Analysis of configuration options or computer systems via analytics engine 208 may be used to readily identify abnormal configuration options and unhealthy computer systems that may be using abnormal configuration options. For example, Bayesian statistics may be applied to compare one or more configuration options among various sets of configuration options associated with computer systems in a population. In some embodiments, results of the configuration analysis may be communicated to a client via client interface device 114.

Figure 6:
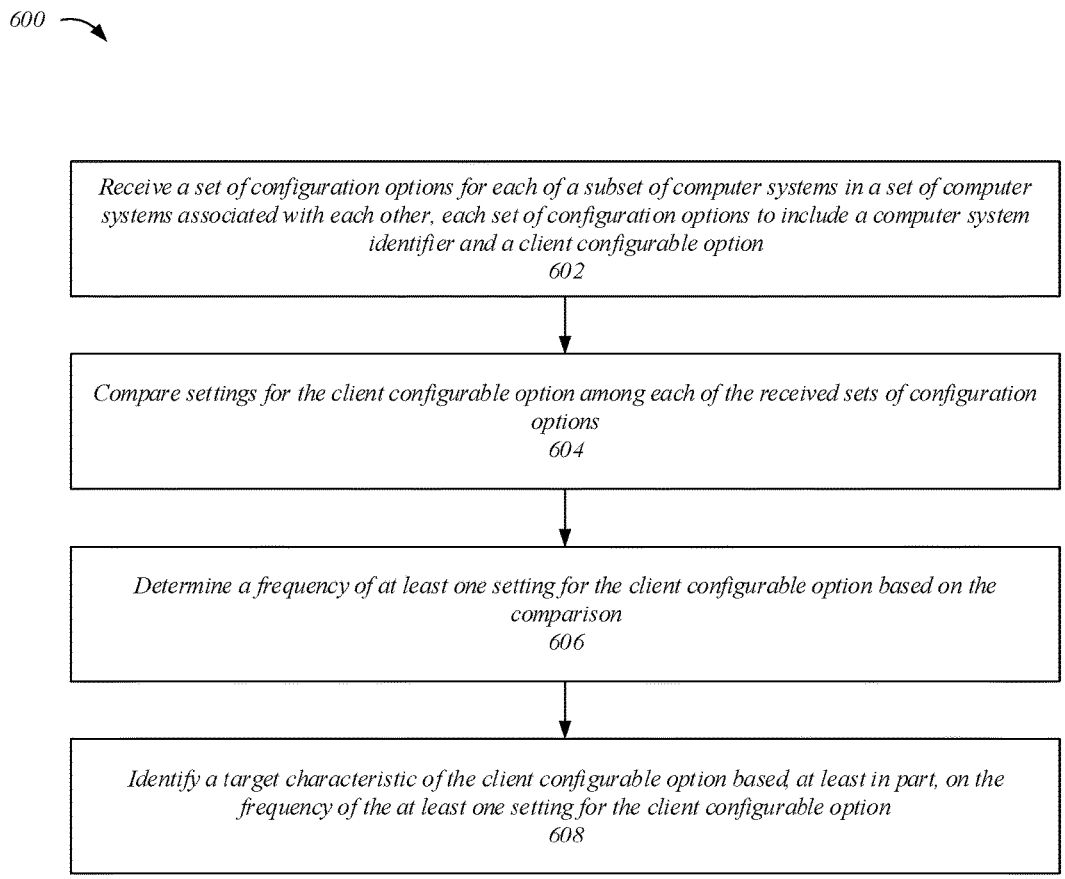
FIG. 6 illustrates an embodiment of a first logic flow.

FIG. 6 illustrates one embodiment of a logic flow 600. The logic flow 600 may be representative of some or all of the operations executed by one or more embodiments described herein, such as the system 100 or the configuration analyzer application 102. Embodiments are not limited in this context.

In the illustrated embodiment shown in FIG. 6, the logic flow 600 may receive a set of configuration options for each of a subset of computer systems in a set of computer systems associated with each other at 602. Each set of configuration options may include a computer system identifier and a client configurable option. At 604, settings for the client configurable option may be compared among each of the received sets of configuration options.

At 606, a frequency of at least one setting for the client configurable option may be determined based on the comparison of 604. At 608 a target characteristic of the client configurable option may be identified, based, at least in part, on the frequency of the at least one setting for the client configurable option.

FIG. 7 illustrates one embodiment of a logic flow 700. The logic flow 700 may be representative of some or all of the operations executed by one or more embodiments described herein, such as the system 100 or the configuration analyzer application 102. Embodiments are not limited in this context.

In the illustrated embodiment shown in FIG. 7, the logic flow 700 may identify a first computer system as potentially misconfigured when a client configurable option of the first computer system conflicts with a target characteristic of the client configurable option for a set of computer systems comprising the first computer system at 702. At 704, a likelihood of misconfiguration may be assigned to the first computer system based, at least in part, on a frequency of at least one setting for the client configurable option among the set of computer systems.

FIG. 8 illustrates an embodiment of a storage medium 800. Storage medium 800 may comprise any non-transitory computer-readable storage medium or machine-readable storage medium, such as an optical, magnetic or semiconductor storage medium. In various embodiments, storage medium 800 may comprise an article of manufacture. In some embodiments, storage medium 800 may store computer-executable instructions, such as computer-executable instructions to implement one or more of logic flows 400, 500, 600, 700 of FIGS. 4-7. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

Figure 9:
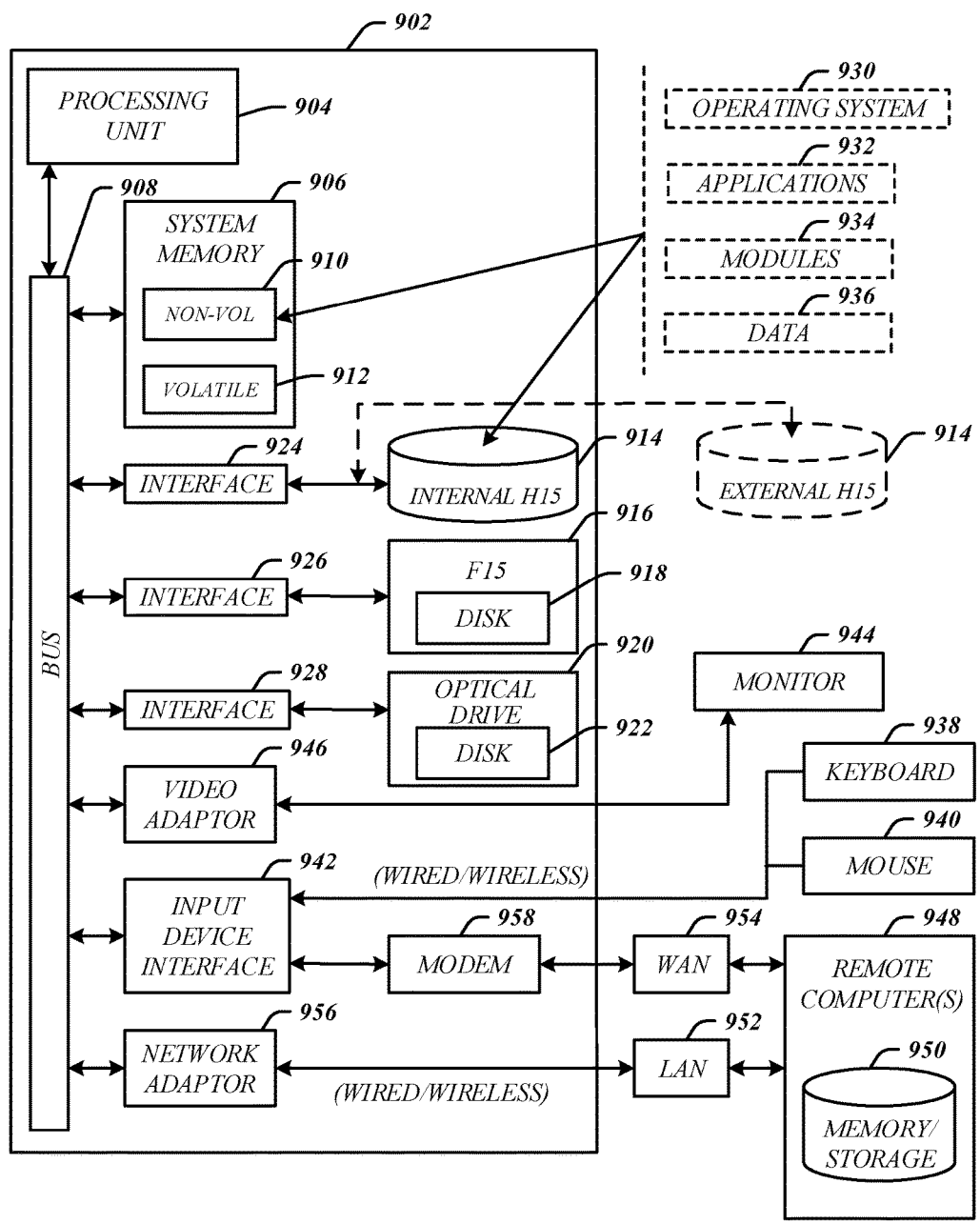
FIG. 9 illustrates an embodiment of a computing architecture.

FIG. 9 illustrates an embodiment of an exemplary computing architecture 900 that may be suitable for implementing various embodiments as previously described. In various embodiments, the computing architecture 900 may comprise or be implemented as part of an electronic device. In some embodiments, the computing architecture 900 may be representative, for example, of a processor server that implements one or more components of the configuration analyzer application 102. In some embodiments, computing architecture 900 may be representative, for example, of a terminal device that implements one or more components of misconfiguration crowdsourcing system 100. The embodiments are not limited in this context.

As used in this application, the terms "system" and "component" and "module" are intended to refer to a computer-related entity, either hardware, a combination of hardware and software, software, or software in execution, examples of which are provided by the exemplary computing architecture 900. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 900 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 900.

As shown in FIG. 9, the computing architecture 900 comprises a processing unit 904, a system memory 906 and a system bus 908. The processing unit 904 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 904.

The system bus 908 provides an interface for system components including, but not limited to, the system memory 906 to the processing unit 904. The system bus 908 can be any of several types of bus structure that may further interconnect to a memory bus (with or without a memory controller), a peripheral bus, and a local bus using any of a variety of commercially available bus architectures. Interface adapters may connect to the system bus 908 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 906 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory (e.g., one or more flash arrays), polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 9, the system memory 906 can include non-volatile memory 910 and/or volatile memory 912. A basic input/output system (BIOS) can be stored in the non-volatile memory 910.

The computer 902 may include various types of computer-readable storage media in the form of one or more lower speed memory units, including an internal (or external) hard disk drive (HDD) 914, a magnetic floppy disk drive (FDD) 916 to read from or write to a removable magnetic disk 918, and an optical disk drive 920 to read from or write to a removable optical disk 922 (e.g., a CD-ROM or DVD). The HDD 914, FDD 916 and optical disk drive 920 can be connected to the system bus 908 by a HDD interface 924, an FDD interface 926 and an optical drive interface 928, respectively. The HDD interface 924 for external drive implementations can include at least one or both of Universal Serial Bus (USB) and IEEE 994 interface technologies.

The drives and associated computer-readable media provide volatile and/or nonvolatile storage of data, data structures, computer-executable instructions, and so forth. For example, a number of program modules can be stored in the drives and memory units 910, 912, including an operating system 930, one or more application programs 932, other program modules 934, and program data 936. In one embodiment, the one or more application programs 932, other program modules 934, and program data 936 can include, for example, the various applications and/or components of the system 100.

A user can enter commands and information into the computer 902 through one or more wire/wireless input devices, for example, a keyboard 938 and a pointing device, such as a mouse 940. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 904 through an input device interface 942 that is coupled to the system bus 908, but can be connected by other interfaces such as a parallel port, IEEE 994 serial port, a game port, a USB port, an IR interface, and so forth.

A monitor 944 or other type of display device is also connected to the system bus 908 via an interface, such as a video adaptor 946. The monitor 944 may be internal or external to the computer 902. In addition to the monitor 944, a computer typically includes other peripheral output devices, such as speakers, printers, and so forth.

The computer 902 may operate in a networked environment using logical connections via wire and/or wireless communications to one or more remote computers, such as a remote computer 948. The remote computer 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wire/wireless connectivity to a local area network (LAN) 952 and/or larger networks, for example, a wide area network (WAN) 954. Such LAN and WAN networking environments are commonplace in offices and companies, and facilitate enterprise-wide computer networks, such as intranets, all of which may connect to a global communications network, for example, the Internet.

When used in a LAN networking environment, the computer 902 is connected to the LAN 952 through a wire and/or wireless communication network interface or adaptor 956. The adaptor 956 can facilitate wire and/or wireless communications to the LAN 952, which may also include a wireless access point disposed thereon for communicating with the wireless functionality of the adaptor 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wire and/or wireless device, connects to the system bus 908 via the input device interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with wire and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 10:
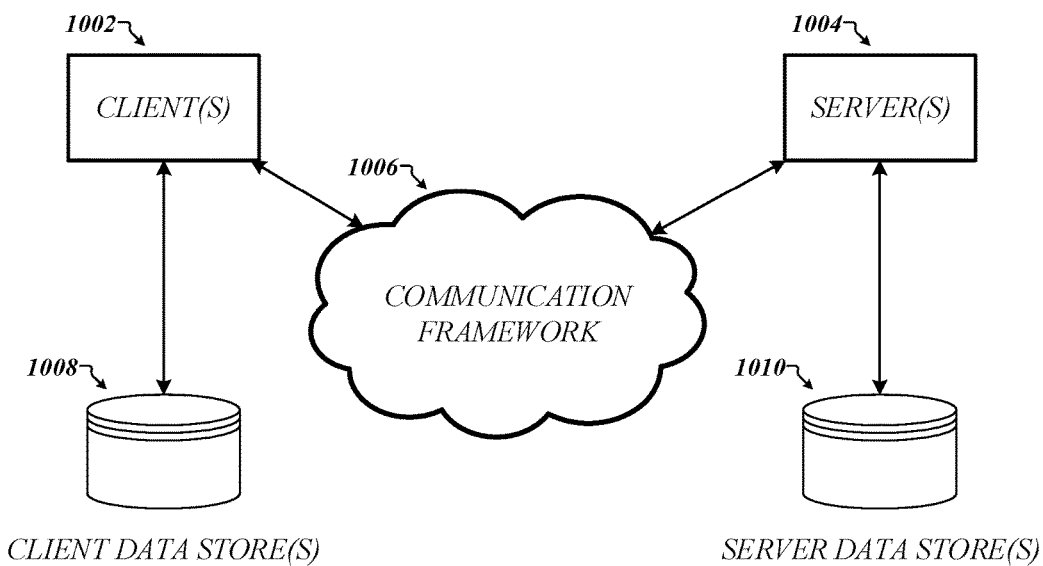
FIG. 10 illustrates an embodiment of a communications architecture.

FIG. 10 illustrates a block diagram of an exemplary communications architecture 1400 suitable for implementing various embodiments as previously described. The communications architecture 1400 includes various common communications elements, such as a transmitter, receiver, transceiver, radio, network interface, baseband processor, antenna, amplifiers, filters, power supplies, and so forth. The embodiments, however, are not limited to implementation by the communications architecture 1400.

As shown in FIG. 10, the communications architecture 1000 comprises includes one or more clients 1002 and servers 1004. The clients 1002 and the servers 1004 are operatively connected to one or more respective client data stores 1008 and server data stores 1010 that can be employed to store information local to the respective clients 1002 and servers 1004, such as cookies and/or associated contextual information. In various embodiments, any one of servers 1004 may implement one or more of logic flows 400-700 of FIGS. 4-7, and storage medium 800 of FIG. 12 in conjunction with storage of data received from any one of clients 1002 on any of server data stores 1010.

The clients 1002 and the servers 1004 may communicate information between each other using a communication framework 1006. The communications framework 1006 may implement any well-known communications techniques and protocols. The communications framework 1006 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1006 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1900 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1002 and the servers 1004. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The following examples pertain to further embodiments, from which numerous permutations and configurations will be apparent.

Example 1 is an apparatus, comprising: a memory; and logic, at least a portion of the logic in circuitry coupled to the memory, the logic to: receive a set of configuration options for each of a subset of computer systems in a set of computer systems associated with each other, each set of configuration options to include a computer system identifier and a client configurable option; compare settings for the client configurable option among each of the received sets of configuration options; determine a frequency of at least one setting for the client configurable option based on the comparison; and identify a target characteristic of the client configurable option based, at least in part, on the frequency of the at least one setting for the client configurable option.

Example 2 includes the subject matter of Example 1, the logic to identify a first computer system of the subset of computer systems as potentially misconfigured when the client configurable option of the first computer system conflicts with the target characteristic of the client configurable option.

Example 3 includes the subject matter of Example 2, the logic to assign a likelihood of misconfiguration to the first computer system based, at least in part, on the frequency of the at least one setting for the client configurable option.

Example 4 includes the subject matter of Example 1, the target characteristic of the client configurable option comprising a setting for the client configurable option that is the most frequent setting among the subset of computer systems.

Example 5 includes the subject matter of Example 4, the logic to identify a first computer system of the subset of computer systems as potentially misconfigured when the client configurable option of the first computer system is different than the most frequent setting for the client configurable option.

Example 6 includes the subject matter of Example 1, the target characteristic of the client configurable option comprising a setting for the client configurable option that is unique among the subset of computer systems.

Example 7 includes the subject matter of Example 6, the logic to identify a first computer system of the subset of computer systems as potentially misconfigured when the client configurable option of the first computer system matches the client configurable option of a second computer system of the subset of computer systems.

Example 8 includes the subject matter of Example 7, the computer system identifier comprising the client configurable option.

Example 9 includes the subject matter of Example 1, the frequency for the at least one setting for the client configurable option comprising a percentage of computer systems in the subset of computer systems with the target characteristic for the client configurable option.

Example 10 includes the subject matter of Example 1, the set of computer systems associated with each other based, at least in part, on a type of service provided by each computer system in the set.

Example 11 includes the subject matter of Example 1, the set of computer systems associated with each other based, at least in part, on allocation to a specific client.

Example 12 is a computer-implemented method, comprising: receiving a set of configuration options for each of a subset of computer systems in a set of computer systems associated with each other, each set of configuration options to include a computer system identifier and a client configurable option; comparing settings for the client configurable option among each of the received sets of configuration options; determining a frequency of at least one setting for the client configurable option based on the comparison; and identifying a target characteristic of the client configurable option based, at least in part, on the frequency of the at least one setting for the client configurable option.

Example 13 includes the subject matter of Example 12, comprising identifying a first computer system of the subset of computer systems as potentially misconfigured when the client configurable option of the first computer system conflicts with the target characteristic of the client configurable option.

Example 14 includes the subject matter of Example 13, comprising assigning a likelihood of misconfiguration to the first computer system based, at least in part, on the frequency of the at least one setting for the client configurable option.

Example 15 includes the subject matter of Example 12, the target characteristic of the client configurable option comprising a setting for the client configurable option that is the most frequent setting among the subset of computer systems.

Example 16 includes the subject matter of Example 15, comprising identifying a first computer system of the subset of computer systems as potentially misconfigured when the client configurable option of the first computer system is different than the most frequent setting for the client configurable option.

Example 17 includes the subject matter of Example 12, the target characteristic of the client configurable option comprising a setting for the client configurable option that is unique among the subset of computer systems.

Example 18 includes the subject matter of Example 17, comprising identifying a first computer system of the subset of computer systems as potentially misconfigured when the client configurable option of the first computer system matches the client configurable option of a second computer system of the subset of computer systems.

Example 19 includes the subject matter of Example 18, the computer system identifier comprising the client configurable option.

Example 20 includes the subject matter of Example 12, the frequency for the at least one setting for the client configurable option comprising a percentage of computer systems in the subset of computer systems with the target characteristic for the client configurable option.

Example 21 includes the subject matter of Example 12, the set of computer systems associated with each other based, at least in part, on a type of service provided by each computer system in the set.

Example 22 includes the subject matter of Example 12, the set of computer systems associated with each other based, at least in part, on allocation to a specific client.

Example 23 is one or more computer-readable media to store instructions that when executed by a processor circuit cause the processor circuit to: receive a set of configuration options for each of a subset of computer systems in a set of computer systems associated with each other, each set of configuration options to include a computer system identifier and a client configurable option; compare settings for the client configurable option among each of the received sets of configuration options; determine a frequency of at least one setting for the client configurable option based on the comparison; and identify a target characteristic of the client configurable option based, at least in part, on the frequency of the at least one setting for the client configurable option.

Example 24 includes the subject matter of Example 23, with instructions to identify a first computer system of the subset of computer systems as potentially misconfigured when the client configurable option of the first computer system conflicts with the target characteristic of the client configurable option.

Example 25 includes the subject matter of Example 24, with instructions to assign a likelihood of misconfiguration to the first computer system based, at least in part, on the frequency of the at least one setting for the client configurable option.

Example 26 includes the subject matter of Example 23, the target characteristic of the client configurable option comprising a setting for the client configurable option that is the most frequent setting among the subset of computer systems.

Example 27 includes the subject matter of Example 26, with instructions to identify a first computer system of the subset of computer systems as potentially misconfigured when the client configurable option of the first computer system is different than the most frequent setting for the client configurable option.

Example 28 includes the subject matter of Example 23, the target characteristic of the client configurable option comprising a setting for the client configurable option that is unique among the subset of computer systems.

Example 29 includes the subject matter of Example 28, with instructions to identify a first computer system of the subset of computer systems as potentially misconfigured when the client configurable option of the first computer system matches the client configurable option of a second computer system of the subset of computer systems.

Example 30 includes the subject matter of Example 29, the computer system identifier comprising the client configurable option.

Example 31 includes the subject matter of Example 23, the frequency for the at least one setting for the client configurable option comprising a percentage of computer systems in the subset of computer systems with the target characteristic for the client configurable option.

Example 32 includes the subject matter of Example 23, the set of computer systems associated with each other based, at least in part, on a type of service provided by each computer system in the set.

Example 33 includes the subject matter of Example 23, the set of computer systems associated with each other based, at least in part, on allocation to a specific client.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

The invention claimed is:

1. A method, comprising:
   determining, by a processor, a frequency for different settings of a configuration option for configuring resources of a plurality of computing systems of a networked system;
   generating, by the processor, a target characteristic for each setting based on the frequency,
      wherein the target characteristic indicates whether each setting is fully unique, fully accordant or between fully unique and fully accordant, wherein a fully unique setting has a lower percentage of computing systems using the setting than a fully accordant setting;
      assigning, by the processor, a likelihood of misconfiguration for each setting based on the target characteristic; wherein the fully unique and the fully accordant settings provide a lower value in determining a likelihood of misconfiguration than any setting that is between fully unique and fully accordant;
   identifying, by the processor, that a first computing system is potentially misconfigured based on whether a first setting for the configuration option is fully unique, fully accordant or between fully unique and fully accordant; and
   modifying the setting of the first computing system to correct the potential misconfiguration.

2. The method of claim 1, wherein the first setting is designated as almost fully unique based on a first percentage of computer systems using the first setting, the first percentage being lower than a second percentage of computer systems using the first setting, the second percentage used to indicate if the first setting is largely discordant.

3. The method of claim 2, wherein the first setting is designated as largely accordant based on a third percentage of computer systems using the first setting, the third percentage lower than a fourth percentage of computer systems using the first setting, the fourth percentage used to indicate if the first setting is almost fully accordant.

4. The method of claim 3, wherein when the first setting is almost fully unique or almost fully accordant, the first setting's likelihood of misconfiguration is higher than when the first setting is between almost fully unique and almost fully accordant.

5. The method of claim 1, wherein the target characteristic is a number.

6. The method of claim 1, wherein the target characteristic is a percentage.

7. The method of claim 1, wherein the target characteristic is a character.

8. The method of claim 1, wherein the target characteristic is an alphanumeric string.

9. A non-transitory machine readable storage medium having stored thereon instructions comprising machine executable code which when executed by a machine, causes the machine to:
   determine, by a processor, a frequency for different settings of a configuration option for configuring resources of a plurality of computing systems of a networked system;
   generate, by the processor, a target characteristic for each setting based on the frequency,
      wherein the target characteristic indicates whether each setting is fully unique, fully accordant or between fully unique and fully accordant, wherein a fully unique setting has a lower percentage of computing systems using the setting than a fully accordant setting;
   assign, by the processor, a likelihood of misconfiguration for each setting based on the target characteristic; wherein the fully unique and the fully accordant settings provide a lower value in determining a likelihood of misconfiguration than any setting that is between fully unique and fully accordant;
   identify, by the processor, that a first computing system is potentially misconfigured based on whether a first setting for the configuration option is fully unique, fully accordant or between fully unique and fully accordant; and
   modify the setting of the first computing system to correct the potential misconfiguration.

10. The storage medium of claim 9, wherein the first setting is designated as almost fully unique based on a first percentage of computer systems using the first setting, the first percentage being lower than a second percentage of computer systems using the first setting, the second percentage used to indicate if the first setting is largely discordant.

11. The storage medium of claim 10, wherein the first setting is designated as largely accordant based on a third percentage of computer systems using the first setting, the third percentage lower than a fourth percentage of computer systems using the first setting, the fourth percentage used to indicate if the first setting is almost fully accordant.

12. The storage medium of claim 11, wherein when the first setting is almost fully unique or almost fully accordant, the first setting's likelihood of misconfiguration is higher than when the first setting is between almost fully unique and almost fully accordant.

13. The storage medium of claim 9, wherein the target characteristic is a number.

14. The storage medium of claim 9, wherein the target characteristic is a percentage.

15. The storage medium of claim 9, wherein the target characteristic is a character.

16. The storage medium of claim 9, wherein the target characteristic is an alphanumeric string.

17. A system, comprising:
a memory containing machine readable medium comprising machine executable code having stored thereon instructions; and a processor module coupled to the memory, the processor module configured to execute the machine executable code to:
determine a frequency for different settings of a configuration option for configuring resources of a plurality of computing systems of a networked system;
generate a target characteristic for each setting based on the frequency,
wherein the target characteristic indicates whether each setting is fully unique, fully accordant or between fully unique and fully accordant, wherein a fully unique setting has a lower percentage of computing systems using the setting than a fully accordant setting;
assign a likelihood of misconfiguration for each setting based on the target characteristic; wherein the fully unique and the fully accordant settings provide a lower value in determining a likelihood of misconfiguration than any setting that is between fully unique and fully accordant;
identify that a first computing system is potentially misconfigured based on whether a first setting for the configuration option is fully unique, fully accordant or between fully unique and fully accordant; and
modify the setting of the first computing system to correct the potential misconfiguration.

18. The system of claim 17, wherein the first setting is designated as almost fully unique based on a first percentage of computer systems using the first setting, the first percentage being lower than a second percentage of computer systems using the first setting, the second percentage used to indicate if the first setting is largely discordant.

19. The system of claim 18, wherein the first setting is designated as largely accordant based on a third percentage of computer systems using the first setting, the third percentage lower than a fourth percentage of computer systems using the first setting, the fourth percentage used to indicate if the first setting is almost fully accordant.

20. The system of claim 19, wherein when the first setting is almost fully unique or almost fully accordant, the first setting's likelihood of misconfiguration is higher than when the first setting is between almost fully unique and almost fully accordant.

21. The system of claim 17, wherein the target characteristic is a number.

22. The system of claim 17, wherein the target characteristic is a percentage.

23. The system of claim 17, wherein the target characteristic is a character.

24. The system of claim 17, wherein the target characteristic is an alphanumeric string.

\* \* \* \* \*